Feb. 17, 1959  R. J. DUNAWAY  2,873,754
TEMPERATURE COMPENSATED PNEUMATIC GOVERNOR
Filed May 2, 1952
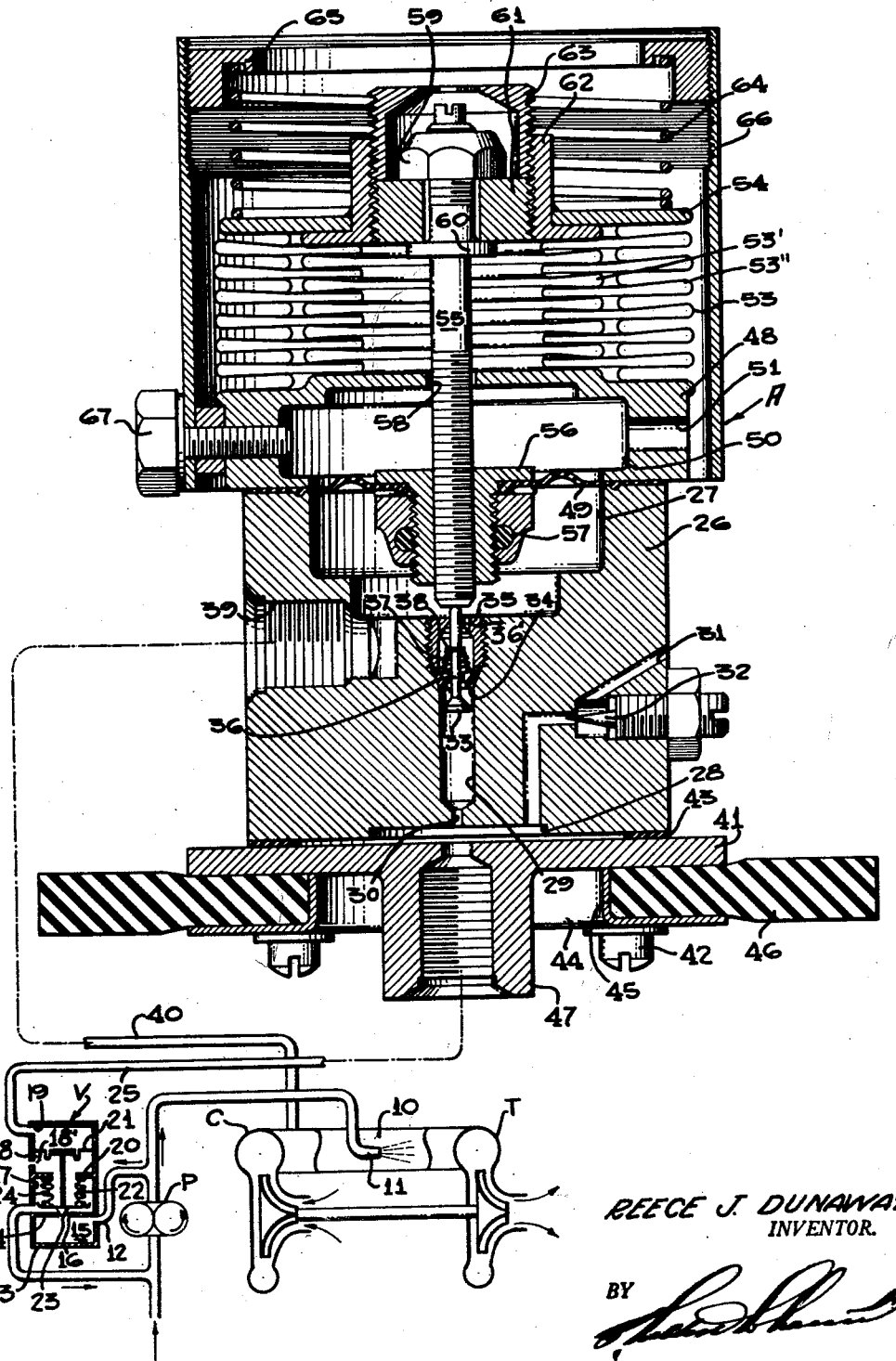
REECE J. DUNAWAY,
INVENTOR.
BY 
ATTORNEY

United States Patent Office 2,873,754
Patented Feb. 17, 1959

2,873,754

TEMPERATURE COMPENSATED PNEUMATIC GOVERNOR

Reece J. Dunaway, South Gate, Calif., assignor to The Garrett Corporation, Los Angeles, Calif., a corporation of California Application May 2, 1952, Serial No. 285,817

6 Claims. (Cl. 137—81)

The present invention relates generally to governing apparatus, and is more particularly concerned with a unique governor which may be utilized for regulating fuel flow to a combustion engine of a power plant, such as a gas turbine unit.

Mechanical inertia governors of the fly-ball type are not generally suitable for the control of gas turbines under conditions where it is desired that the speed shall increase with increased load up to maximum allowable speed with maximum load.

In accordance with the general concepts of the present invention, it is contemplated to provide a pneumatically actuated governor which will control the power plant in accordance with the pressure ratio across a compressor for furnishing combustion air for the power plant, and wherein cognizance is taken of temperature variations. Since the design characteristics of any particular compressor are predicated to a large extent on the ratio of the density of the inlet air to that at the outlet, it will be seen that by keeping this ratio substantially constant the compressor will deliver highest efficiency over the range of air flows required.

A further object is to provide a governor of the pneumatic type, which incorporates unique means for compensating for barometric and temperature variations.

It is also an object to provide a construction in a governor which by virtue of its general configuration is readily adapted for support on a flexible support member.

Further objects of the invention will be brought out in the following part of the specification, wherein detailed description is for the purpose of fully disclosing the invention without placing limitations thereon.

Referring to the accompanying drawings, which are for illustrative purposes only, the single figure is a view schematically showing the manner in which the governor is incorporated with the fuel control system of the gas turbine power plant, and includes a sectional view of the governor to reveal its cooperatively associated elements.

Referring generally to the drawings, the pneumatic governor of the present invention, as generally indicated at A, is schematically shown as being incorporated as a part of the fuel control for a power plant which basically comprises a gas driven turbine T having a combustion chamber 10 supplied with combustion supporting air from a compressor C, a suitable fuel nozzle 11 being positioned within the combustion chamber to supply the combustible fuel thereto.

The nozzle 11 connects with one side of a conventional fuel pump P, the other side of the pump being connected with a suitable source of supply. Control of the fuel for the nozzle 11 is obtained by means of a bypass 12 between the inlet and outlet sides of the pump P, this bypass being under the control of a valve V which will now be explained.

Any suitable type of pneumatically controlled valve may be utilized for controlling the bypass 12. In the present instance, the valve V has been illustrated as comprising a casing 13 having a fixed wall 14 inwardly spaced from one end of the casing and cooperating therewith to provide a chamber 15 in communication with a flow opening 16 in the wall 14. Between the wall 14 and the opposite end of the casing, the interior of the casing is divided into separated chambers 17, 18 and 19 by movable wall structures 20 and 21. The wall structure 20 comprises a bellows 22 which is anchored at one end and communicates interiorly with chamber 18, and is connected at its other end to a metering valve 23 operatively associated with the opening 16 and adapted to seat therein in closed position. A coil spring 24 supplements the action of the bellows and acts to urge the valve towards seated position. The valve 23 is further connected by means of a suitable connecting structure with the movable wall structure 21, shown as a diaphragm.

The chamber 15 is connected to receive fuel pressure from the high-pressure side of the fuel pump, while chamber 17 is connected to the low-pressure side of the pump, and chamber 18 communicates through a suitable port 18' with atmosphere. The chamber 19 is connected through a conduit 25 with a controlled source of fluid pressure which will subsequently be described.

Briefly the valve V is arranged to vary the pressure of fuel supplied to the nozzle 11 by increasing or decreasing the amount of fuel bypassed around the pump P. When pressure in the chamber 19 is increased, the valve 23 will be actuated towards closing position so as to decrease the amount of bypassed fuel, and when the pressure in this chamber is decreased, the valve 23 will be actuated towards a further opened position so as to increase the amount of bypassed fuel.

The pneumatic governor A is utilized to control the fluid pressure in the chamber 19, and this governor will now be described in detail.

As shown, the governor A comprises a main casing body 26 of suitable material which is fabricated to provide a relatively large end opening recess 27 at one end and a shallow end opening recess 28 at the opposite end, these recesses being interconnected through a bore passage 29 which communicates with the recess 28 through a restricted passage 30.

The recess 28 is also connected with the exterior of the casing body by means of a venting bore passage 31 through which flow is controlled by means of an adjustable metering pin 32.

Flow through the bore passage 29 is under control of a valve 33 which is cooperatively associated with a valve seat 34 formed at one end of a threaded mounting nut 35 within which a stem 36 of the valve is reciprocably supported. The mounting nut 35 is formed with an internal cavity which communicates through a passage 36' with the recess 27, and within which there is positioned a coiled expansion spring 37 which surrounds the stem 36, one end of this spring bearing against the wall of the nut cavity and the other end bearing against a flange 38 of the stem so as to normally bias the valve 33 in a closing direction. The stem 36 projects into the recess 27 where it is associated with an actuating mechanism to be subsequently described.

The interior of the recess 27 communicates with a threaded connection opening 39 in the side of the casing body for connection with a conduit, in this instance a conduit 40 which is connected with a fluid pressure source such as the outlet side of the compressor C.

The end of the casing body 26 containing the recess 28 is closed by an end cover 41 secured by means of a plurality of mounting screws 42, a sealing gasket 43 being interposed between the end cover and the adjacent end of the casing body. The securing screws 42 also clampingly secure a clamping flange 44 to the marginal periphery of an opening 45 in a flexible mounting ring 46 of rubber or other suitable material.

At its center, the end cover 41 is provided with a projecting boss 47 which is internally threaded to provide a conduit connection, in this case, a connection with conduit 25. This connection therefore provides communication between the recess 28 in the casing body and the chamber 19 in valve V.

At the other end of the casing body 26, an end cover 48 is secured by conventional means, a movable wall 49 in the form of a diaphragm being peripherally secured between the outer marginal portions of the casing body and end cover.

The end cover is of hollow construction and is fabricated to provide an end opening recess 50 which is in communication with the exterior by means of a port passage 51.

Axially aligned with and mounted upon the end cover 48 is a bellows 53 having one end anchored to the end cover and its other end secured to an end flange 54. This bellows 53 may be variously constructed and in the present instance is shown as embodying inner and outer spaced walls 53' and 53" respectively, although a single walled bellows might be used in some constructions of the invention. This bellows is responsive to barometric pressure variations, and in order to make the bellows further responsive to temperature changes, the space between the walls is charged with a fluid such as air or other suitable medium which will cause expansion and contraction of the bellows in response to temperature changes.

The recesses 27 and 50 cooperate to form fluid pressure chambers on opposite sides of the diaphragm 49 so that the diaphragm will react to relative variations of said pressures. Movements of the diaphragm are utilized to control the operating effect of valve 33 and the response of the bellows 53 to barometric pressure and temperature changes is utilized to modify the actuation of the valve 33 by diaphragm 49.

Accordingly, the diaphragm 49 and bellows 53 are interconnected for modifying operation by means of an elongate stem 55 which threadedly engages at one end with a retainer or nut 56 positioned at the central axis of the diaphragm and clampingly secured thereto by means of a securing nut 57.

The other end of the stem 55 extends through an opening 58 in the wall of recess 50 and is threaded to receive a securing nut 59 which cooperates with a stem flange 60 to releasably clampingly secure the stem 55 to an adjusting nut 61 having threaded engagement with the interior of a tubular wall portion 62 of the end flange 54. The nut 59 is in turn shielded by means of a nut cover 63 which also threadedly engages the tubular wall portion 62.

In addition to the operating forces resulting from movements of the diaphragm 49 and operation of the bellows 53, the outward expansion of the bellows and movement of the diaphragm in one direction is biased by means of an expansion coil spring 64 having one of its ends bearing against the flange 54, while its other end is seated in an adjustable retainer ring 65 having threaded engagement with the interior of a cylindrical sleeve 66. This sleeve is secured to the end cover 48 by securing bolts such as indicated at 67, or other suitable means, and protects the bellows and other parts at this end of the governor.

With the arrangement as described above, it will be appreciated that if the bellows 53 is constructed as disclosed and filled with a suitable gas having a predetermined pressure at a specific temperature, the relationship of the stem 55 and valve 33 may be so adjusted that the governor will respond to variations in the pressure ratio across the compressor C and take into consideration variations in altitude and variations in temperature with respect to a predetermined selected value, for example, variations from sea level and a predetermined base temperature.

The stem 55 may be adjustably raised or lowered by turning the nut 61. Such adjustment will vary its relationship with respect to the valve stem 36 and move the valve to set it at a desired metering point depending upon specific installation requirements. The stem 55 is also arranged for independent rotation in the nut 61, upon loosening the nut 59. This will operate through the retainer 56 to shift the plane of the central area portion of the diaphragm 49 with respect to the plane of its peripheral marginal area. The pressure of fluid in the chamber 27 will act to bulge the diaphragm upwardly. In the position of the retainer, as shown, the peak of this bulge will be centrally positioned between the periphery of the retainer 56 and the outer wall of recess 27. Now, if the retainer is adjusted to a normally higher position on the stem 55, the peak of the bulge will be shifted towards the periphery of the retainer, whereas adjustment of the retainer to a lower position on the stem will shift the peak of the bulge away from the periphery of the retainer. The vertical component of force acting to move the stem 55 is thus varied with respect to the movable axis of the diaphragm. It is therefore the practice in the design of diaphragms to consider the effective diameter as extending from the peak bulge on one side to the peak bulge on the opposite side of the diaphragm axis. Movement of the central area towards the recess 50 in a direction away from the full line position, as shown in the drawing, will therefore have the effect of decreasing the effective area of the diaphragm 49 which is acted upon by fluid pressure in moving the stem 55 to actuate the valve 33. Adjusting movement of the central area in the opposite direction will increase the effective area. Thus the diaphragm may be correctively adjusted for the normal metering position of the valve 33 to meet varied installation conditions.

The spring 64 not only supplements the fluid pressure in the recess 50 acting on the diaphragm 49, but also provides adjustable means by which the length of the bellows and the consequent pressure therein for a given temperature may be adjustably regulated for a normal metering position of the valve 33.

Assuming that the governor is adjusted in the manner explained above to maintain the desired ratio between the inlet and outlet pressures of the compressor at the designed speed of the power plant, a pressure level will normally be maintained in the chamber 19 of the valve V as determined by the setting of the metering pin 32. If the altitude should now be increased, neglecting temperature changes for purpose of discussion, the bellows 53 will be caused to expand, and as a result the valve 33 will be moved towards closed position so as to decrease the supply pressure of fluid furnished through the valve into the recess 28. As a consequence, the pressure in the recess 28 and the chamber 19 will be decreased, causing valve 23 to open and permit a greater amount of fuel flow through the bypass. This will reduce the pressure of fuel supplied to the nozzle 11 so as to adjust the amount of fuel to the proper amount to maintain the speed of the power plant constant and secure the desired ratio between the inlet and outlet pressures of the compressor.

Similarly, the reaction of the bellows 53 to temperature changes modifies the operation of the valve 33 in the proper direction to compensate for such changes in maintaining the speed of the power plant. For example, if the temperature is increased, the bellows 53 will expand. This will tend to raise the stem 55 away from the valve stem 36, and thus permit movement of the valve 33 by the spring 37 to further restrict flow into the bore 29 and recess 28 from the lower side of the diaphragm. The pressure will be reduced in chamber 19, thus permitting the valve 23 to open and bypass a greater amount of fuel, with the result that the fuel pressure at the nozzle 11 is reduced and less fuel supplied.

Considering now the operation of the valve 33 by movement of the diaphragm 49 due to changes in the ratio of pressure across the compressor, it will be apparent that a decrease in compressor discharge pressure will reduce the pressure acting on the lower side of the diaphragm in the recess 27. Neglecting for purposes of discussion, the barometric pressure and temperature compensating effects of the bellows 53, the pressures acting on the diaphragm will be unbalanced in such a direction as to move the stem 55 in a downward direction so as to move the valve 33 towards greater opening. This will cause an increase of fluid pressure in chamber 19 of the valve V which will tend to move the valve member 23 towards closed position so as to decrease the amount of fuel being bypassed, and increase the amount of fuel delivered to the nozzle 11. Since the decrease in outlet pressure of the compressor would be brought about by load conditions and a decrease in speed of the driving turbine, the governor acts to increase the supplied fuel in order to bring the turbine speed back to a condition in which the pressure ratio across the compressor will again be brought to the proper value.

It is appreciated that various modifications may suggest themselves to those skilled in the art without departing from the spirit of the present invention, and, hence, it is desired that the invention shall not be restricted to the form or forms shown or uses mentioned, except to the extent indicated in the appended claims.

I claim:

1. A pneumatically actuated governor for regulating fuel flow to a combustion engine, comprising: a casing having a chamber therein; a diaphragm dividing said chamber, said diaphragm being responsive to a fluid differential pressure; means modifying the operation of said diaphragm in accordance with barometric and temperature variations; a passage communicating with one side of said diaphragm adapted for connection with a pneumatically controlled fuel device, said passage having a restricted flow orifice therein; a valve actuated by said diaphragm in said passage on one side of said orifice for controlling passage flow; and an adjustable atmospheric bleed connection with said passage on the opposite side of said orifice, whereby a predetermined pressure level may be established in the fluid delivered to said device.

2. A pneumatically actuated governor for a gas turbine unit, comprising: a casing defining a chamber; a diaphragm dividing said chamber, the chamber on one side of the diaphragm being connected to atmosphere and on the other side having a communicating passage adapted for connection with the outlet pressure of a compressor for supplying combustion air to said turbine, and a passage adapted for connection with pneumatically controlled fuel supply means for said turbine; valve means actuated by said diaphragm for controlling flow in the latter of said passages; means for variably venting said latter passage to atmosphere; and means modifying the operation of said diaphragm in accordance with changes in a variable.

3. A pneumatic governor for a gas turbine unit, comprising: a casing defining a chamber; a diaphragm dividing said chamber, the chamber on one side of the diaphragm being connected to atmosphere and on the other side having a fluid pressure inlet connection and an outlet connection therefor; a valve between said outlet connection and the associated chamber portion; an atmospheric vent between said outlet connection and said valve; means connecting said valve for actuation by said diaphragm; and means modifying the operation of said diaphragm in accordance with barometric and ambient temperature changes.

4. A pneumatically actuated governor for regulating fuel flow to a combustion engine, comprising: a casing having a chamber therein; a movable wall dividing said chamber; means for differentially subjecting the opposite sides of said wall to fluid pressures; a valve controlled passage in communication with the fluid on one side of said wall adapted for connection with fluid pressure actuated fuel control means, said valve having an actuating connection with said wall and being normally operable in response to the differential action of said fluid pressures on said wall to control the fluid flow from said one side of said wall through said passage; and bellows means connected to said wall for correctively modifying the normal actuation of said valve by said wall so as to compensate for barometric and ambient temperature changes.

5. In a pneumatically actuated governor: a casing having a chamber therein; a diaphragm of flexible material dividing said chamber and anchored at its peripheral margin, said diaphragm being differentially subjected on its opposite sides to fluids under pressure; a passage on one side of said diaphragm for supplying a control fluid pressure from the fluid acting on said one side of the diaphragm; a valve for controlling said passage, said valve being operable in an opening direction by said diaphragm; means biasing said valve in a closing direction; an annular bellows on the opposite side of said diaphragm for modifying the operation of the diaphragm in response to atmospheric changes; adjustable means connecting the outer end of said bellows and said diaphragm including an elongate member having axially adjustable connections respectively at its outer and inner ends, the outer end connection being with the outer end of said bellows and the inner end connection being with the central portion of said diaphragm, said connections being accessible and independently variable from the outer end of the member, and the connection with said diaphragm being operable to modify the deflection of the central portion thereof and vary in effect the area of said diaphragm normally acted upon by said fluid pressure.

6. In a pneumatically actuated governor: a casing having a chamber therein; a diaphragm supported in said chamber, one side of said diaphragm being subject to atmospheric pressure and the other side to a fluid pressure greater than atmosphere; a passage connecting with said latter side of said diaphragm for supplying fluid pressure for control of a pneumatic device; a valve for controlling said passage, said valve being operable in an opening direction by said diaphragm; means biasing said valve in a closing direction; a bellows on the opposite side of said diaphragm responsive to barometric changes and containing a temperature responsive medium; means connecting said bellows with said diaphragm; and adjustable atmospheric bleed means on the downstream side of said valve.

References Cited in the file of this patent

UNITED STATES PATENTS

| | | |
|---|---|---|
| 962,551 | Conrader | June 28, 1910 |
| 1,925,571 | Rogers et al. | Sept. 5, 1933 |
| 1,944,485 | Anderson | Jan. 23, 1934 |
| 2,078,453 | Miller | Apr. 27, 1937 |
| 2,313,149 | Jacobsson | Mar. 9, 1943 |
| 2,408,836 | Warner | Oct. 8, 1946 |
| 2,426,552 | Wertz | Aug. 26, 1947 |
| 2,470,742 | Haase et al. | May 17, 1949 |
| 2,545,703 | Orr | Mar. 20, 1951 |
| 2,559,938 | Carey | July 10, 1951 |
| 2,643,514 | Jubb | June 30, 1953 |
| 2,688,841 | Decker et al. | Sept. 14, 1954 |
| 2,693,932 | Richards | Nov. 9, 1954 |
| 2,706,885 | Ostroff | Apr. 26, 1955 |
| 2,715,009 | Beekley | Aug. 9, 1955 |

FOREIGN PATENTS

| | | |
|---|---|---|
| 201,237 | Great Britain | July 26, 1923 |
| 941,556 | France | July 19, 1948 |

OTHER REFERENCES

Flagle: Abstract of application Serial No. 554,992, published April 25, 1950, in 634 O. G. 310.